(12) United States Patent
Hazra et al.

(10) Patent No.: US 9,165,092 B2
(45) Date of Patent: Oct. 20, 2015

(54) WIND FARM LAYOUT IN CONSIDERATION OF THREE-DIMENSIONAL WAKE

(75) Inventors: Jagabondhu Hazra, Bangalore (IN); Shivkumar Kalyanaraman, Bangalore (IN); Sathyajith Mathew, Gadong (BN); Devasenapathi Periagraharam Seetharamakrishnan, Bangalore (IN); Mitra Shubhadip, Kanpur (IN)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 13/563,265

(22) Filed: Jul. 31, 2012

(65) Prior Publication Data

US 2014/0039843 A1 Feb. 6, 2014

(51) Int. Cl.
*G06F 17/50* (2006.01)

(52) U.S. Cl.
CPC ............ *G06F 17/5009* (2013.01); *G06F 17/50* (2013.01); *G06F 17/5004* (2013.01); *G06F 2217/08* (2013.01); *Y02E 10/725* (2013.01); *Y04S 40/22* (2013.01)

(58) Field of Classification Search
None
See application file for complete search history.

(56) References Cited

U.S. PATENT DOCUMENTS 7,941,304 B2 * 5/2011 Gundling ...................... 703/6
8,050,899 B2 11/2011 Giguere et al.
8,554,519 B2 * 10/2013 Dilkina et al. ..................... 703/1
2011/0149268 A1 6/2011 Marchant et al.
2011/0208483 A1 8/2011 Dilkina et al.
2012/0050750 A1 3/2012 Hays et al.

FOREIGN PATENT DOCUMENTS

| EP | 2128441 A2 | 2/2009 |
| EP | 2246563 A2 | 3/2010 |
| EP | 2463794 A1 | 6/2012 |
| WO | WO2004011799 A1 | 2/2004 |
| WO | 2009027509 | 3/2009 |

OTHER PUBLICATIONS

Wan, Chunqiu, et al. "Optimal Micro-siting of Wind Farms by Particle Swarm Optimization" Advances in Swarm Intelligence: Lecture Notes in Computer Science, vol. 6145, pp. 198-205 (2010) available at <http://link.springer.com/chapter/10.1007/978-3-642-13495-1_25>.*
Rivas, Rajai Aghabi "Optimization of Offshore Wind Farm Layouts" Masters Thesis, Technical U. Denmark (2007).*
Mittal, Anshul "Optimization of the Layout of Large Wind Farms Using a Genetic Algorithm" Masters Thesis, Case Western Reserve U. (2010).*
Chowdhury, Souma "Unrestricted Wind Farm Layout Optimization (UWFLO): Investigating Key Factors Influencing the Maximum Power Generation" Renewable Energy, vol. 38, pp. 16-30 (Aug. 17, 2011) available from <http://www.sciencedirect.com/science/article/pii/S0960148111003260>.*

(Continued)

*Primary Examiner* — Kandasamy Thangavelu
*Assistant Examiner* — Jay B Hann
(74) *Attorney, Agent, or Firm* — Ference & Associates LLC

(57) ABSTRACT

Methods and arrangements for determining a layout and dimensions of a wind farm. A three-dimensional wake model for a wind farm is generated, and a positioning and dimensioning model for turbines of the wind farm is developed based on the three-dimensional wake model.

18 Claims, 6 Drawing Sheets

(56) References Cited

OTHER PUBLICATIONS

Shengping, Gu & Li, Ji "Study on Optimization of Wind Farm Micro-Layout" Power & Energy Engineering Conf. APPEEC (2010) available from <http://ieeexplore.ieee.org/xpls/abs_all.jsp?arnumber=5448416>.*

Gonzalez, Javier, et al. "Optimization of Wind Farm Turbines Layout Using an Evolutive Algorithm" Renewable Energy, vol. 35, pp. 1671-1681 (2010).*

Larsen GC. et al. "Topfarm—Next Generation Design Tool for Optimisation of Wind Farm Topology and Operation" Publishable final activity report. Risø-R-1805 (EN), Risø DTU, Roskilde, Denmark, (Feb. 2011).*

Troldborg, Niels "Actuator Line Modeling of Wind Turbine Wakes" PhD Dissertation, Department Mechanical Engineering, Technical U. Denmark (2008).*

Nilsson, K. J., "Estimation of wind energy production in relation to orographic complexity, a reliability study of two conventional computer software," Master of Science Thesis, Department of Energy and Environment, Division of Electric Power Engineering, Chalmers University of Technology, 2010, 102 pages, Goteborg, Sweden.

Molina, D. L., "Modeling of Wakes Behind Wind Turbines," Mar. 31, 2008, 179 pages, Technical University of Denmark, Department of Mechanical Engineering, Fluid Mechanics Section, Lyngby, Denmark.

Rivas, R. A., "Optimization of Offshore Wind Farm Layouts," Aug. 15, 2007, 73 pages, DTU Dong Energy, Lyngby, Denmark.

Rathmann, O. et al., "Turbine Wake Model for Wind Resource Software," EWEC 2006 Wind Energy Conference and Exhibition, pp. 1-12, Athens, Greece.

Djerf, E. et al., "Evaluation of the Software Program WindFarm and Comparisons with Measured Data from Alsvik," FFA TN 2000-30, 86 pages, The Aeronautical Research Institute of Sweden, Bromma, Sweden.

International Search Report for PCT/CA2013/050493, Sep. 19, 2013, 1 page, Canadian Intellectual Property Office, Gatineau, Quebec, Canada.

Wubow, Steffen, et al., "3D-simulation of the turbulent wake behind a wind turbine," Journal of Physics, Conference Series 75 (2007), 8 pages, IOP Publishing, URL: http://iopscience.iop.org/1742-6596/75/1/012033/pdf/jpconf7_75_012033.pdf, Accessed Dec. 16, 2013.

* cited by examiner

WIND FARM LAYOUT IN CONSIDERATION OF THREE-DIMENSIONAL WAKE

BACKGROUND

Wind energy has proven to be a highly promising renewable energy source. Generally, the amount of energy generated by a wind farm is a function of wind velocity, wind direction, terrain, inter-turbine influence, and turbine parameters. Where a number of turbines are co-located, the wind speed experienced by a downstream turbine will be less than that received by the upstream turbines due to the wake effect. This wake loss depends on wind velocity, direction and layout of turbines within a wind farm. Wind speed depends on type of terrain as well. Each topography has a different surface roughness, which affects characteristics of turbine wake and turbulence. To date, conventional efforts have not fully embraced possibilities for positioning and locating turbines in close proximity in a manner to generate power most effectively.

BRIEF SUMMARY

In summary, one aspect of the invention provides a method comprising: operating a processor and memory to execute a program of instructions for: generating a three-dimensional wake model for a wind farm; developing a positioning and dimensioning model for turbines of the wind farm based on the three-dimensional wake model; providing a three-dimensional layout of wind turbines in the wind farm based on the positioning and dimensioning model; and outputting for display the three-dimensional layout of wind turbines in the wind farm according to positioning and dimensioning model.

A further aspect of the invention provides an apparatus comprising: at least one processor; and a computer readable storage medium having computer readable program code embodied therewith and executable by the at least one processor, the computer readable program code comprising: a computer readable storage medium having computer readable program code embodied therewith, the computer readable program code comprising: computer readable program code configured to generating a three-dimensional wake model for a wind farm; computer readable program code configured to develop a positioning and dimensioning model for turbines of the wind farm based on the three-dimensional wake model; computer readable program code configured to provide a three-dimensional layout of wind turbines in the wind farm based on the positioning and dimensioning model; and computer readable program code configured to output for display the three-dimensional layout of wind turbines in the wind farm according to positioning and dimensioning model.

Another aspect of the invention provides a computer program product comprising: a computer readable storage medium having computer readable program code embodied therewith, the computer readable program code comprising: computer readable program code configured to generating a three-dimensional wake model for a wind farm; computer readable program code configured to develop a positioning and dimensioning model for turbines of the wind farm based on the three-dimensional wake model; computer readable program code configured to provide a three-dimensional layout of wind turbines in the wind farm based on the positioning and dimensioning model; and computer readable program code configured to output for display the three-dimensional layout of wind turbines in the wind farm according to positioning and dimensioning model.

An additional aspect of the invention provides a method comprising: operating a processor and memory to execute a program of instructions for: generating a layout model of wind turbines for the prospective wind farm, the layout model; said generating comprising running a three-dimensional wake model with respect to wind turbines for the prospective wind farm, the three-dimensional wake model accepting as input at least one member selected from the group consisting of: wind farm boundaries; terrain type; meteorological data; and capital cost budget.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
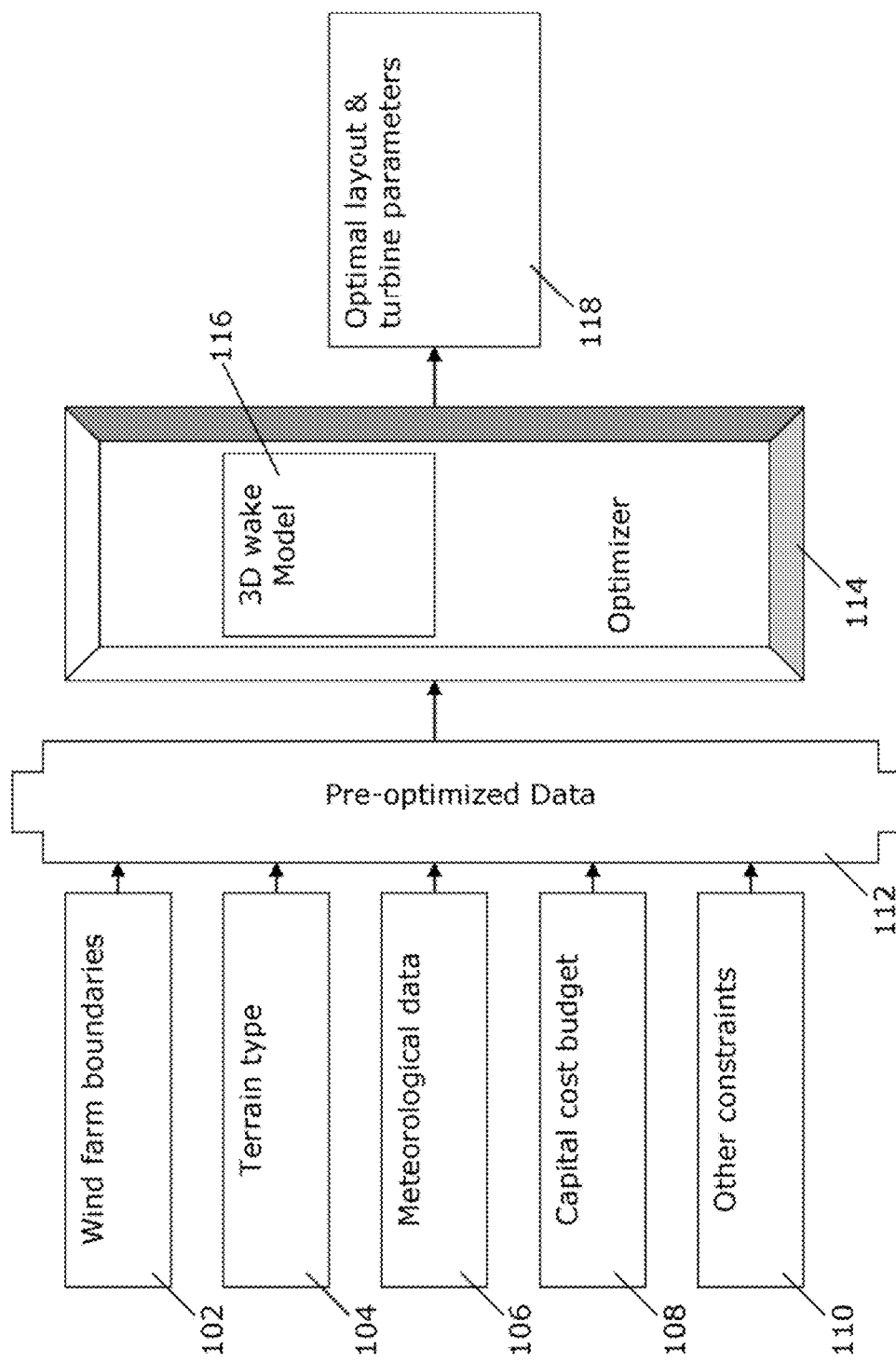
FIG. 1 schematically illustrates an operation modality.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-6. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 6. In accordance with an example embodiment, most if not all of the process steps, components and outputs discussed with respect to FIGS. 1-4 can be performed or utilized by way of a processing unit or units and system memory such as those indicated, respectively, at 16' and 28' in FIG. 6, whether on a server computer, a client computer, a node computer in a distributed network, or any combination thereof.

Broadly contemplated herein, in accordance with at least one embodiment of the invention, are methods and arrangements, given a wind farm, its wind profile and a maximum investment budget, for determining an optimal number of turbines N, their 3D (three-dimensional) co-ordinates ($x_i$, $y_i$, $z_i$) and turbine specifications (including but not limited to blade lengths, thickness, etc.), by way of minimizing or reducing costs of energy generation (wherein the x and y coordinates specify the location, and the z coordinate specifies the height). System and methods are broadly embraced herein for capturing 3D wake in complex terrains, choosing the optimal 3D layout of individual turbines within a wind farm, choosing the optimal design parameters (number of turbines, hub height, rotor radius, etc.) and minimizing cost per unit energy produced subject to constraints such as operating budget.

Conventionally in any wind farm, wind turbines are placed at same height. In accordance with at least one embodiment of the invention, proposed herein is an optimal solution where turbine hubs are placed in 3D. In the existing methods, homogeneous turbines are usually considered. Proposed herein is the deployment of heterogeneous turbines to maximize power output. Traditionally, while optimizing the layout of any wind farm, only 2D (X, Y) coordinates are considered. Here, there are optimized turbine positions in 3D (X, Y and Z). As turbine heights are equal, a 2D wake model is usually used to optimize turbine positions. Herein, there is proposed a 3D wake model to optimize the 3D layout. Since turbines with different heights are considered, other turbine parameters (such as blade width, rotor radius, etc) may be used for optimization and maximize budget utilization.

In accordance with at least one embodiment of the invention, an input step involves the collection of input data including not limited to physical boundary of the site, terrain type, metrological data (wind speed, direction, distribution), budget and other constraints. As turbine hub height is varied, a 3D wake model (based on laminar flow) is developed to estimate the actual wind speed felt by each individual turbine. Wake model is a function of turbine parameters (height, rotor radius, etc), inter turbine distance, 3D wind speed and direction, terrain characteristics, etc. To calculate wake overlap in 3D space, the wake of any upstream turbine is projected on a surface passing through the downstream turbine hub and perpendicular to the wind direction.

In accordance with at least one embodiment of the invention, an optimizing technique is employed. Particularly, a meta-heuristic optimization technique is used to solve the aforementioned optimization problem. It optimizes the number of wind turbines with specifications (e.g., rotor radius), 3D co-ordinate (X, Y, Z) of each turbine hub, cumulative power output, capital cost, etc.

FIG. 1 schematically illustrates an operation modality, in accordance with at least one embodiment of the invention. In a manner to be discussed more fully below, several elements (102-110) can each form a part of pre-optimized (or input) data 112 that itself is fed to an optimizer 114. Optimizer 114 contains a 3D wake model 116 which, when run on the basis of input, yields an output (118) of optimal turbine layout and turbine parameters. As shown, input data 112 can be created from elements (e.g., parameters or other quantitative input data) such as wind farm boundaries 102, terrain type 104, meteorological data 106, a capital cost budget 108 and other constraints 110.

Figure 2:
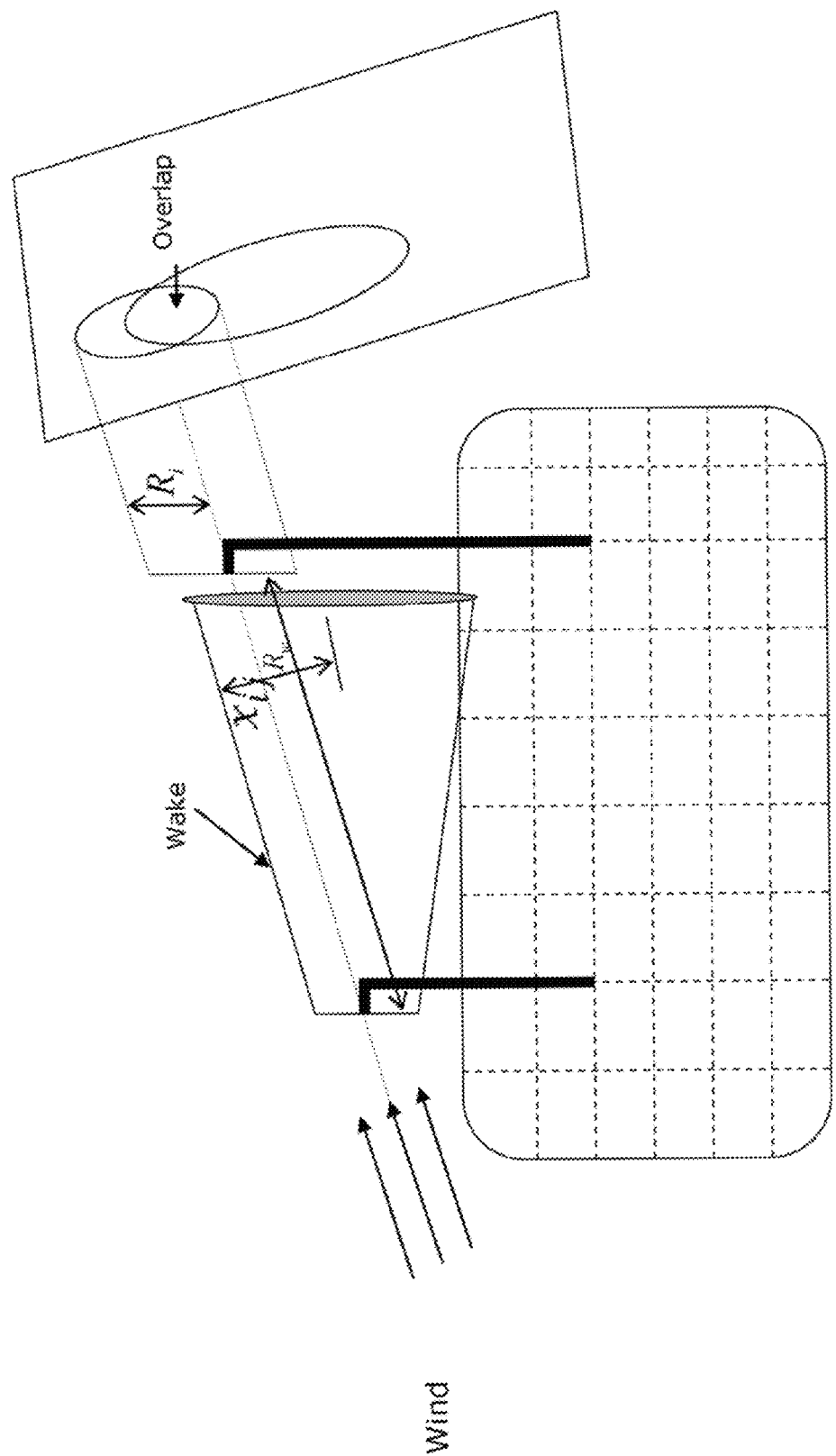
FIG. 2 illustrates a 3-dimensional wake model.

FIG. 2 illustrates a 3-dimensional wake model, in accordance with at least one embodiment of the invention. With $R_w$ as the wake radius at a downstream turbine, $R_i$ as the rotor radius of the downstream turbine and $x_{ij}$ as the interturbine distance in the wind direction, a 3D wind vector $\overline{d_w}$ can be expressed as follows:

$$\overline{d_w} = w_1\hat{i} + w_2\hat{j} + w_3\hat{k}$$

Figure 3:
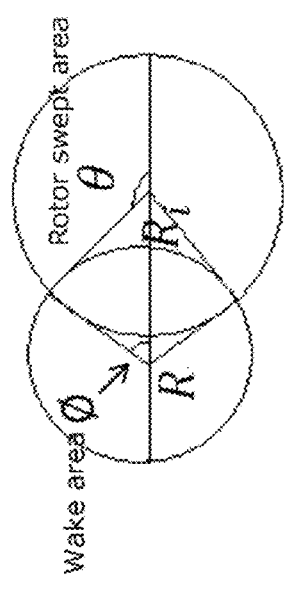
FIG. 3 graphically illustrates basic parameters for computation of overlap area.
Figure 3:
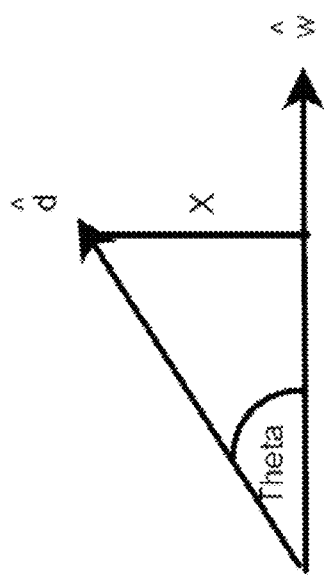

By way of calculating overlap area, in accordance with at least one embodiment of the invention, FIG. 3 graphically illustrates some basic parameters for consideration. Accordingly, consider $$foverlap_{ij} = \frac{A_{overlap}}{\pi R_i^2}, \text{ where}$$

$$A_{overlap} = \begin{cases} R_w^2(\phi - \sin\phi\cos\phi) + R_i^2(\theta - \sin\theta\cos\theta) & R_w - R_i \le X_{ij} \le R_w + R_i \\ \pi R_i^2 & 0 \le X_{ij} < R_w - R_i \\ 0 & \text{otherwise} \end{cases},$$

where $R_w = 2\left(R_j + \left(\frac{0.5x_{ij}}{\ln(z_i/z_0)}\right)\right)$ is the wake radius, $$\phi = \cos^{-1}\left(\frac{R_w^2 + X_{ij}^2 - R_i^2}{2X_{ij}R_w}\right), 0 \le \phi \le \frac{\pi}{2} \text{ for } R_w - R_i \le X_{ij} \le R_w + R.$$

$$\theta = \cos^{-1}\left(\frac{R_w^2 - X_{ij}^2 - R_i^2}{2X_{ij}R_i}\right), 0 \le \theta \le \pi R_w - R_i \le X_{ij} \le R_w + R.$$

Suppose $$\overline{d} = (x_i - x_j)\hat{i} + (y_i - y_j)\hat{j} + (z_i - z_j)\hat{k}$$

is the distance vector between the $i^{th}$ turbine and the $j^{th}$ turbine, and $$\vec{d_w} = w_1\hat{i} + w_2\hat{j} + w_3\hat{k}$$

is the unit vector along the wind direction. Then, $$x_{ij} = \vec{d_w} \cdot \vec{d},$$

where "·" implies a scalar product. Continuing, $X_{ij}$ is defined as follows:

$$X_{ij} = \sqrt{|\vec{d}|^2 - x_{ij}^2} \text{ for } x_{ij} > 0.$$

Figure 4:
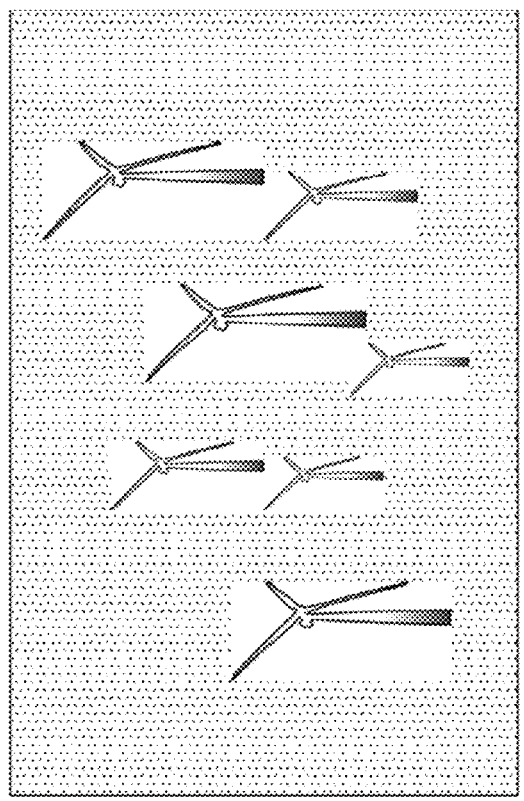
FIG. 4 provides a schematic comparison of a conventional 2D wind farm layout with a 3D layout.
Figure 4:
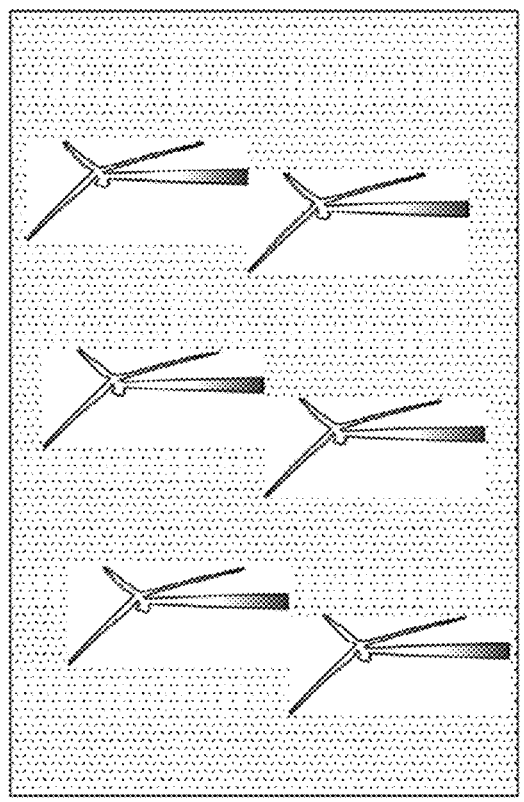

In accordance with at least one embodiment of the invention, it can be appreciated that wind farm layout can be very critical to the success of a wind farm project. A schematic comparison of a conventional 2D layout with a 3D layout is shown in FIG. 4. The micro-siting of a wind farm involves optimally placing the wind turbines which minimizes the cost of power. Wind power varies proportional to the cube of wind speed which is sensitive to the tower height and wake effects caused by other turbines. With higher towers, there is an increase in wind power with the tradeoff of higher capital cost. However, placing the wind turbines at different heights can reduce the wake effect significantly, thus improving the net cost of power generation.

Turning now to wind velocity calculations, in accordance with at least one embodiment of the invention, in a wind farm, if turbines are placed at various heights, there will be 3D wake effect based on the positions of the turbines and the direction of wind flow. Wind speed at any down stream turbine at a distance x can be written as:

$$V = U\left[1 - \left(1 - \sqrt{1 - C_T}\right)\left(\frac{D}{D + 2Kx}\right)^2\right]$$

where, U is the free wind speed, V is wake wind speed, $C_T$ is the thrust coefficient of the turbine; K is the wake decay constant; x is the horizontal distance behind the upstream turbine and D is the rotor diameter of the upstream turbine.

In accordance with at least one embodiment of the invention, the above formula will be valid only if the wake of the upstream turbine covers the full swept area of the downstream turbine. In practice, the wake of the upstream turbine may intersect a portion of the swept area of the downstream turbine either because of wind direction or because of different hub heights. As such, let $A_{overlap}$ denote the swept area of the downstream turbine subjected to the wake effect caused by the upstream turbine. Let $$f_{overlap} = \frac{4A_{overlap}}{\pi D^2}$$

be the corresponding fraction of area. Then there is the following expression:

$$V = U\left[1 - \left(1 - \sqrt{1 - C_T}\right)\left(\frac{D}{D + 2Kx}\right)^2 \times f_{overlap}\right]$$

Or, $V = U(1-d)$ where d is usually referred as depression coefficient, given by:

$$d = \left(1 - \sqrt{1 - C_T}\right)\left(\frac{D}{D + 2Kx}\right)^2 \times f_{overlap}$$

In accordance with at least one embodiment of the invention, it can be appreciated that if the upstream turbine is placed at an height of $h_1$ and the downstream turbine is placed at an height of $h_2$, then the velocity expression can be written as follows:

$$V = U_{h_2}\left(1 - d \times \left(\frac{U_{h_1}}{U_{h_2}}\right)^2\right)$$

where $U_{h_1}$ and $U_{h_2}$ are the upwind velocities at height $h_1$ and $h_2$, respectively.

In accordance with at least one embodiment of the invention, the relationship of wind velocity to height can be written as:

$$\frac{U_{h_1}}{U_{h_2}} = \left(\frac{h_1}{h_2}\right)^\alpha,$$

where $\alpha$ is the coefficient of surface roughness. Substituting above relation in the velocity expression, there is yielded:

$$V = U_{h_2}\left(1 - d \times \left(\frac{h_1}{h_2}\right)^{2\alpha}\right)$$

Now, if the reference free wind speed measured at height $h_0$ is $U_0$, then $U_{h_2}$ can be written as follows:

$$U_{h_2} = U_0 \times \left(\frac{h_2}{h_0}\right)^\alpha$$

Replacing $U_{h_2}$, there is obtained:

$$V = U_0 \times \left(\frac{h_2}{h_0}\right)^\alpha \times \left(1 - d \times \left(\frac{h_1}{h_2}\right)^{2\alpha}\right)$$

In accordance with at least one embodiment of the invention, in general terms, the wake wind speed at turbine n due to wake of turbine i can be written as:

$$V_{i,n} = U_n \times \left(1 - d \times \left(\frac{h_i}{h_n}\right)^{2\alpha}\right);$$

$$U_n = U_0 \times \left(\frac{h_n}{h_0}\right)^\alpha$$

Owing to multiple wakes, wind speed of any downstream turbine n can be written as:

$$V_n = U_n - \sqrt{\sum_{i=1; i \neq n} (U_n - V_{i,n})^2}$$

where $V_{i,n}$ is the wind speed at turbine n due to wake of turbine i.

By way of calculating cumulative power output, in accordance with at least one embodiment of the invention, first it can be established that power output of any generator i is given by:

$$P_i = \sum_{j=1}^{M} \sum_{k=1}^{Q} p(U_{jk}) \times \frac{1}{2}\gamma\rho\pi R_i^2 \times [v_i(s)]^3,$$

where M is number of wind direction profiles, Q is number of wind velocity profiles, $p(U_{jk})$ is the probability of free wind speed blowing in direction $\theta_j$ with a velocity of $U_k$ measured at a standard height. Further, $\gamma$ represents turbine power efficiency coefficients, $\rho$ is the standard air density and R is blade radius and $v_i(s)$ is the actual wind speed felt by a turbine for $j^{th}$ wind direction profile and $k^{th}$ wind velocity profile. Cumulative power output of the wind farm is then given by $$P_{out} = \sum_{i=1}^{N} P_i,$$

with N as the number of turbines. Expected annual energy production (AEP) of the farm is given by $$AEP = \sum_{t=1}^{T} P_{out,t} \times t,$$

with $P_{out,t}$ being the average power output for time period t.

By way of calculating energy costs, in accordance with at least one embodiment of the invention. As such, COE (cost of energy) can be computed as $$COE = \frac{ICC(S) * FCR}{AEP(S)} + AOE(S)$$

where
follows: COE≡levelized Cost of Energy ($/KWh)
FCR≡Fixed Charge Rate (%/year)

$$AOE(S) = \sum_{i \in S} AOE(i) = \sum_{i \in S} \left( \frac{O \& M(i) + LRC(i)}{AEP(S)} \right) + LLC(S)$$

where
O&M≡Levelized Operations and Maintenance Cost ($)
LRC≡Levelized Replacement/overhaul Cost ($)
LLC≡Land Lease Cost ($)
AEP≡expected Annual Energy Production in (KWh)
ICC≡Initial Capital Cost in ($)
AOE≡Annual Operational Expenses in ($/year)
Here, the arguments S and i represent turbines cumulatively and individually, respectively.

By way of an optimization problem, in accordance with at least one embodiment of the invention, the following is employed:

$$\text{Minimize } COE = \frac{ICC(S) * FCR}{AEP(S)} + AOE(S)$$

subject to
Budget Constraint: ICC (S)≤MaxCost
Proximity Constraint: For all $1 \leq i < j \leq N$, $(x_i-x_j)^2+(y_i-y_j)^2 \geq 2.25(R(i)+R(j))^2$
Boundary Constraint: For all $11 < N$, $0 \leq x_i \leq X_{max}$, $0 \leq y_i \leq Y_{max}$, $Z_{min} \leq z_i \leq Z_{max}$
Variables: N, S={<$x_i, y_i, z_i, R(i)$>:$1 \leq i \leq N$}

Generally, in accordance with at least one embodiment of the invention, particle swarm optimization (PSO) is employed. However, other techniques are conceivable. As such, the PSO algorithm is a population-based, global and stochastic optimization algorithm, inspired by social behavior of fish schooling and bird flocking It is easy to implement, leads to faster convergence and is computationally inexpensive. The PSO algorithm starts with a population of particles whose positions and velocities are randomly initialized in the search space. In each iteration, each particle updates its position and velocity based on the experience of personal best position and global best position seen so far.

Figure 5:
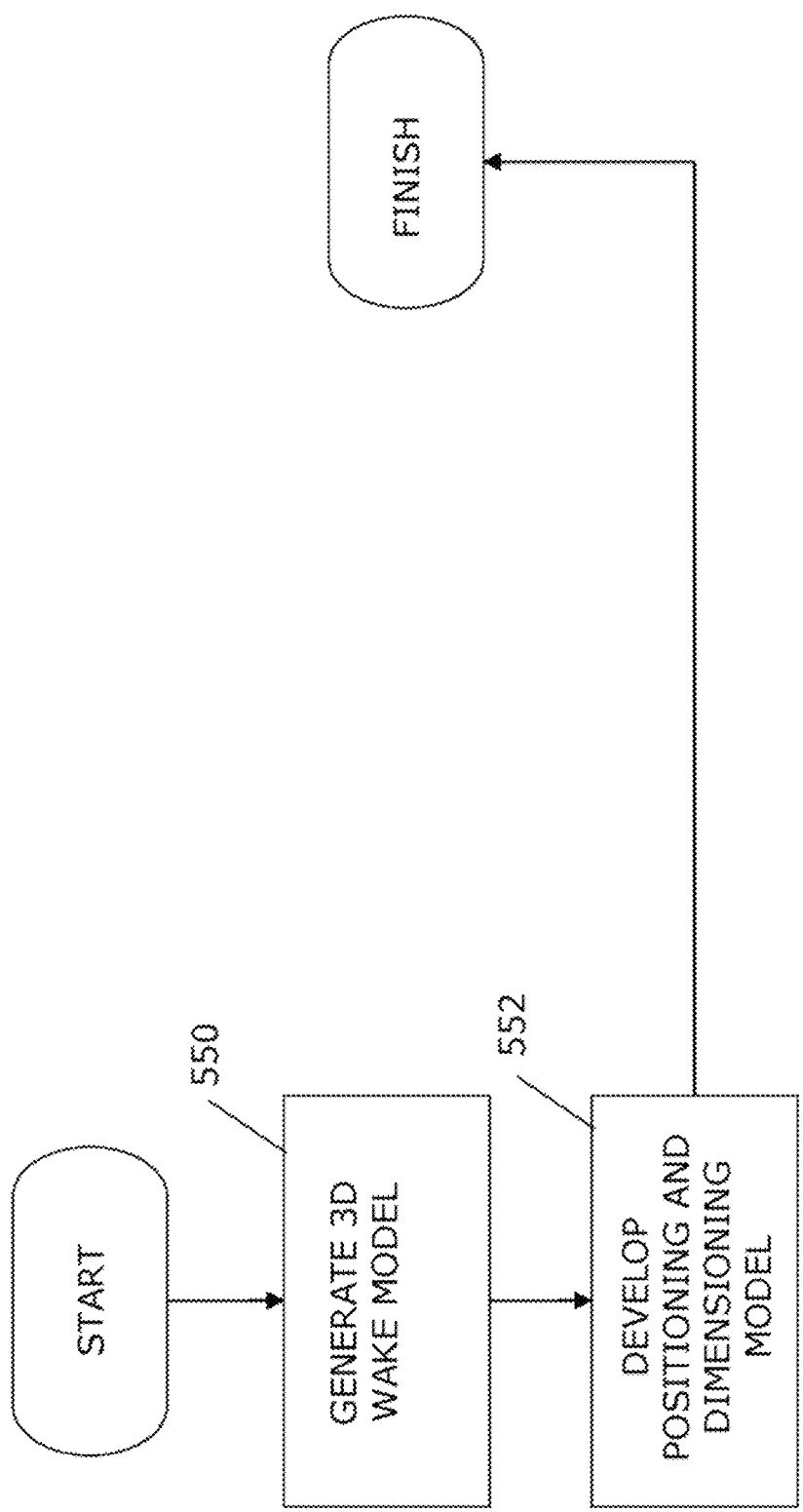
FIG. 5 sets forth a process more generally for determining a layout and dimensions of a wind farm.

FIG. 5 sets forth a process more generally for determining a layout and dimensions of a wind farm, in accordance with at least one embodiment of the invention. It should be appreciated that a process such as that broadly illustrated in FIG. 5 can be carried out on essentially any suitable computer system or set of computer systems, which may, by way of an illustrative and non-restrictive example, include a system such as that indicated at 12' in FIG. 6. In accordance with an example embodiment, most if not all of the process steps discussed with respect to FIG. 5 can be performed by way a processing unit or units and system memory such as those indicated, respectively, at 16' and 28' in FIG. 6.

As shown in FIG. 5, in accordance with at least one embodiment of the invention, a three-dimensional wake model for a wind farm is generated (550), and a positioning and dimensioning model for turbines of the wind farm is developed based on the three-dimensional wake model (552).

Figure 6:
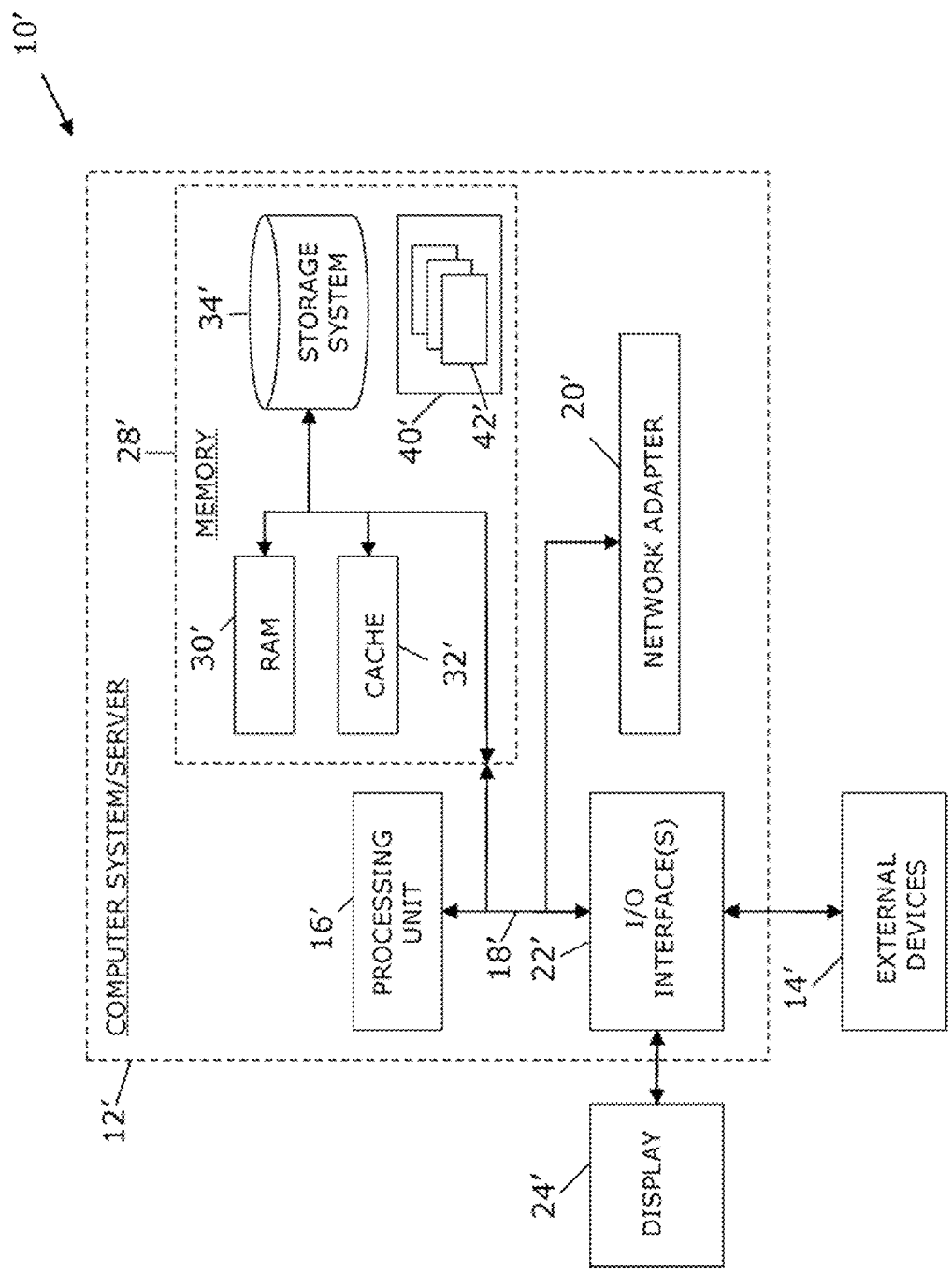
FIG. 6 illustrates a computer system.

Referring now to FIG. 6, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
operating a processor and memory to execute a program of instructions for:
generating, based on a three-dimensional wind vector, a three-dimensional wake model for a wind farm;
calculating a wake overlap area based on the three-dimensional wake model;
developing a positioning and dimensioning model for turbines of the wind farm based on the three-dimensional wake model and wake overlap area;
providing a three-dimensional layout of wind turbines in the wind farm based on the positioning and dimensioning model; and
outputting for display the three-dimensional layout of wind turbines in the wind farm according to positioning and dimensioning model.

2. The method according to claim 1, wherein said developing comprises developing a model to position heterogeneously sized and dimensioned wind turbines with respect to one another at the wind farm based on the three-dimensional wake model.

3. The method according to claim 1, wherein said developing comprises developing a model to position turbines with respect to three dimensions.

4. The method according to claim 1, wherein said developing comprises developing a model governing at least one member selected from the group consisting of: number of turbines; hub height of a turbine; and turbine rotor radius.

5. The method according to claim 1, wherein said generating comprises accepting as input at least one member selected from the group consisting of: wind farm boundaries; terrain type; meteorological data; and capital cost budget.

6. The method according to claim 1, wherein said developing comprises employing particle swarm optimization.

7. An apparatus comprising:
at least one processor; and
a computer readable storage medium having computer readable program code embodied therewith and executable by the at least one processor, the computer readable program code comprising:
computer readable program code configured to generate, based on a three-dimensional wind vector, a three-dimensional wake model for a wind farm;
computer readable program code configured to calculate a wake overlap area based on the three-dimensional wake model;
computer readable program code configured to develop a positioning and dimensioning model for turbines of the wind farm based on the three-dimensional wake model and wake overlap area;
computer readable program code configured to provide a three-dimensional layout of wind turbines in the wind farm based on the positioning and dimensioning model; and
computer readable program code configured to output for display the three-dimensional layout of wind turbines in the wind farm according to positioning and dimensioning model.

8. The apparatus according to claim 7, wherein to develop comprises developing a model to position heterogeneously sized and dimensioned wind turbines with respect to one another at the wind farm based on the three-dimensional wake model.

9. The apparatus according to claim 7, wherein to develop comprises developing a model to position turbines with respect to three dimensions.

10. The apparatus according to claim 7, wherein to develop comprises developing a model governing at least one member selected from the group consisting of: number of turbines; hub height of a turbine; and turbine rotor radius.

11. The apparatus according to claim 7, wherein to generate comprises accepting as input at least one member selected from the group consisting of: wind farm boundaries; terrain type; meteorological data; and capital cost budget.

12. The apparatus according to claim 7, wherein to develop comprises employing particle swarm optimization.

13. A computer program product comprising:
a non-transitory computer readable storage medium having computer readable program code embodied therewith, the computer readable program code comprising:
computer readable program code configured to generate, based on a three-dimensional wind vector, a three-dimensional wake model for a wind farm;
computer readable program code configured to calculate a wake overlap area based on the three-dimensional wake model;
computer readable program code configured to develop a positioning and dimensioning model for turbines of the wind farm based on the three-dimensional wake model and wake overlap area;
computer readable program code configured to provide a three-dimensional layout of wind turbines in the wind farm based on the positioning and dimensioning model; and
computer readable program code configured to output for display the three-dimensional layout of wind turbines in the wind farm according to positioning and dimensioning model.

14. The computer program product according to claim 13, wherein said computer readable program code is configured to develop a model to position heterogeneously sized and dimensioned wind turbines with respect to one another at the wind farm based on the three-dimensional wake model.

15. The computer program product according to claim 13, wherein said computer readable program code is configured to develop a model to position turbines with respect to three dimensions.

16. The computer program product according to claim 13, wherein said computer readable program code is configured to develop a model governing at least one member selected from the group consisting of: number of turbines; hub height of a turbine; and turbine rotor radius.

17. The computer program product according to claim 13, wherein said computer readable program code is configured to accept as input at least one member selected from the group consisting of: wind farm boundaries; terrain type; meteorological data; and capital cost budget.

18. The computer program product according to claim 13, wherein said computer readable program code is configured to employ particle swarm optimization.

* * * * *

UNITED STATES PATENT AND TRADEMARK OFFICE
CERTIFICATE OF CORRECTION

| | |
|---|---|
| PATENT NO. | : 9,165,092 B2 |
| APPLICATION NO. | : 13/563265 |
| DATED | : October 20, 2015 |
| INVENTOR(S) | : Jagabondhu Hazra et al. |

It is certified that error appears in the above-identified patent and that said Letters Patent is hereby corrected as shown below:

Title Page, Item (73) Assignee Name should be:

INTERNATIONAL BUSINESS MACHINES CORPORATION
Armonk, NY (US)

and

UNIVERSITI BRUNEI DARUSSALAM
Brunei Darussalam (BN)

Signed and Sealed this
Twenty-eighth Day of June, 2016

Michelle K. Lee
*Director of the United States Patent and Trademark Office*